United States Patent
Golkowski et al.

(10) Patent No.: US 12,291,984 B2
(45) Date of Patent: May 6, 2025

(54) METHOD FOR EVALUATING AN EXHAUST NOx SENSOR IN THE EXHAUST SYSTEM OF SPARK IGNITION INTERNAL COMBUSTION ENGINE

(71) Applicant: Volkswagen Aktiengesellschaft, Wolfsburg (DE)

(72) Inventors: Marc-Andre Golkowski, Hannover (DE); Till Stoetzel, Velten (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/614,730

(22) Filed: Mar. 24, 2024

(65) Prior Publication Data

US 2024/0318586 A1   Sep. 26, 2024

(30) Foreign Application Priority Data

Mar. 23, 2023   (DE) ...................... 10 2023 202 667.8

(51) Int. Cl.
*F01N 11/00* (2006.01)
*F01N 3/10* (2006.01)
(Continued)

(52) U.S. Cl.
CPC ............ *F01N 11/007* (2013.01); *F01N 3/101* (2013.01); *F01N 13/008* (2013.01);
(Continued)

(58) Field of Classification Search
CPC ...... F01N 3/101; F01N 11/007; F01N 13/008; F01N 2550/02; F01N 2560/025;
(Continued)

(56) References Cited

U.S. PATENT DOCUMENTS 10,145,284 B2   12/2018   Hoyos Velasco et al.
10,634,032 B2   4/2020    Wang et al.
(Continued)

FOREIGN PATENT DOCUMENTS

DE   102016205170 A1 *  10/2017  .............. F01N 11/00
DE   102018109686 A1    10/2018
(Continued)

OTHER PUBLICATIONS

Isabella Nova et al. "Urea-SCR Technology for deNOx After Treatment of Diesel Exhausts" Fundamental and Applied Catalysis, Chapter 14 (Ming-Feng Hsieh et al: Diesel Engine SCR systems: Modeling, Measurements, and Control) Springer, 2014, pp. 425-451.

*Primary Examiner* — Audrey B. Walter
(74) *Attorney, Agent, or Firm* — Muncy, Geissler, Olds & Lowe, P.C.

(57) ABSTRACT

A method for evaluating a sensor signal of an exhaust NOx sensor, which is disposed downstream of a three-way catalytic converter in an exhaust system of a spark ignition internal combustion engine. An ammonia factor is modeled downstream of the three-way catalytic converter using an ammonia formation model. A NOx emission is modeled in the exhaust system downstream of the three-way catalytic converter using a NOx model. The modeled ammonia emissions and the modeled NOx emission are separated by a separation algorithm using the sensor signal of the exhaust NOx sensor. The separation algorithm provides quantitative information about the tailpipe ammonia emissions and the tailpipe NOx emissions of the spark ignition internal combustion engine. An engine control unit and an internal combustion engine for carrying out such a method are also provided.

20 Claims, 4 Drawing Sheets (51) Int. Cl.
*F01N 13/00* (2010.01)
*F02D 41/14* (2006.01)

(52) U.S. Cl.
CPC .... *F01N 2550/02* (2013.01); *F01N 2560/025* (2013.01); *F01N 2560/026* (2013.01); *F01N 2570/14* (2013.01); *F01N 2570/18* (2013.01); *F01N 2900/0404* (2013.01); *F02D 2041/1417* (2013.01)

(58) Field of Classification Search
CPC ........... F01N 2560/026; F01N 2570/14; F01N 2570/18; F01N 2900/0404; F02D 2041/1417
See application file for complete search history.

(56) References Cited

U.S. PATENT DOCUMENTS

| | | | |
|---|---|---|---|
| 2010/0050614 A1* | 3/2010 | Parmentier | F01N 3/208 60/287 |
| 2011/0192144 A1* | 8/2011 | Yasui | F02D 41/1475 60/276 |
| 2013/0255233 A1* | 10/2013 | Yasui | F01N 11/00 60/286 |
| 2016/0115851 A1* | 4/2016 | Kogo | F01N 3/208 60/276 |

FOREIGN PATENT DOCUMENTS

| | | |
|---|---|---|
| DE | 102018132313 A1 | 6/2019 |
| WO | WO2011093772 A1 | 8/2011 |

\* cited by examiner

Fig. 1

METHOD FOR EVALUATING AN EXHAUST NOx SENSOR IN THE EXHAUST SYSTEM OF SPARK IGNITION INTERNAL COMBUSTION ENGINE

This nonprovisional application claims priority under 35 U.S.C. § 119(a) to German Patent Application No. 10 2023 202 667.8, which was filed in Germany on Mar. 23, 2023, and which is herein incorporated by reference.

BACKGROUND OF THE INVENTION

Field of the Invention

The invention relates to a method for evaluating an exhaust gas sensor in the exhaust system of a spark ignition internal combustion engine, to a control device for carrying out such a method, and to a spark ignition internal combustion engine with an exhaust system in which such an exhaust gas sensor is disposed.

Description of the Background Art

The current and increasingly stricter future exhaust gas legislation places high demands on the raw engine emissions and the exhaust aftertreatment of internal combustion engines. In this regard, the requirements for a further reduced consumption and the further tightening of emission standards with regard to permissible nitrogen oxide emissions represent a challenge for engine developers. In gasoline engines, exhaust gas purification takes place in a known manner via a three-way catalytic converter, as well as further catalytic converters, connected upstream and downstream of the three-way catalytic converter, and a particulate filter. In order to monitor the exhaust emissions of a gasoline engine, exhaust gas sensors are disposed in the exhaust system, which monitor the functionality of the exhaust gas aftertreatment components as part of on-board diagnostics.

The future Euro 7 emissions legislation requires distance-based and cumulative detection of individual emissions through on-board monitoring (OBM). These distance-based emissions are usually given in mg/km. A continuous determination of the emissions is required for this, which can be sensor-based or model-based. Further, with the introduction of the Euro 7 emissions legislation, the quantity of ammonia (NH3) will also be legally limited in addition to the already limited exhaust gas components such as unburnt hydrocarbons (HC), carbon monoxide (CO), and nitrogen oxides (NOx).

Sensors for detecting ammonia in the exhaust gas of a diesel engine are already known from the commercial vehicle sector. However, due to their high measurement tolerances, such sensors are unsuitable for monitoring the ammonia emissions of a passenger car with a gasoline engine as part of on-board monitoring, as these sensors have too high a measurement accuracy for on-board monitoring. Further, sensors for detecting nitrogen oxides, with which systems for the selective, catalytic reduction of nitrogen oxides are controlled or regulated, are known in particular from the exhaust aftertreatment of diesel engines. However, such nitrogen oxide sensors have a cross sensitivity to ammonia, so that a nitrogen oxide sensor installed in the exhaust system detects both ammonia and nitrogen oxides. However, the evaluation of such a sensor signal is problematic in order to draw conclusions about the proportions of nitrogen oxides and ammonia from the sensor signal.

An evaluation model for a nitrogen oxide sensor in the exhaust system of a gasoline engine is known from the prior art. In this regard, splitting of the signal from the nitrogen oxide sensor into a nitrogen oxide component and an ammonia component is made based on the oxygen content determined in the exhaust system via a lambda sensor. In the case of a substoichiometric exhaust gas, the signal from the nitrogen oxide sensor is interpreted as an ammonia emission, whereas in the case of a superstoichiometric exhaust gas, the signal from the nitrogen oxide sensor is interpreted as a nitrogen oxide emission. Further, in this simple model a cold start of the internal combustion engine is not taken into account, in which the exhaust gas aftertreatment components are not yet effective or are effective only to a limited extent.

With a stoichiometric exhaust gas, in which the combustion air ratio changes in an alternating manner about a lambda value of 1, both ammonia and nitrogen oxide emissions can occur. A concrete distinction between the ammonia and nitrogen oxide emissions is not possible with such a simple interpretation model of the sensor signal. Furthermore, other factors influencing the formation of ammonia, such as, for example, the catalyst core temperature, are not taken into account in such a simple interpretation model.

An exhaust aftertreatment system for a diesel engine is known from DE 10 2018 132 313 A1. The exhaust aftertreatment system includes a selective catalytic reduction (SCR) device and an injection system disposed to inject reductant into the exhaust pipe upstream of the SCR device. A single ammonia sensor is disposed to monitor an exhaust gas feed stream downstream of the SCR device. A controller is in communication with the single ammonia sensor and the internal combustion engine and is operatively connected to the injection system. The controller includes an instruction set that is executable to monitor, via the single ammonia sensor, an ammonia amount in the exhaust gas stream downstream of the SCR device and to determine the NOx efficiency of the SCR device based on the ammonia amount in the exhaust gas stream downstream of the SCR device. A fault is detected in the SCR device based upon the NOx efficiency.

A spark ignition internal combustion engine with an exhaust aftertreatment system is known from DE 10 2018 109 686 A1, which corresponds to US 2019/0186318. The exhaust aftertreatment system includes a dosing system that injects NH3 into an exhaust gas stream generated by the engine. An SCR device stores an amount of NH3 and converts the NOx into molecular nitrogen (N2) and water (H2O) based on the stored amount of NH3.

A method and a system for the estimation of respective concentrations of nitrogen oxides and ammonia in exhaust gases from a diesel engine downstream of an SCR catalytic converter are known from WO2011/093772 A1, wherein the estimation is based on a catalyst model and on a measured sensor signal from a nitrogen oxide sensor which is so situated that it is in contact with the exhaust gases. In this case, the measured sensor signal is compared with an estimated signal which depends on at least two estimation functions and represents the match between the catalyst model and the measured sensor signal. This comparison is then used for the determination of at least one deviation parameter for the respective at least two estimation functions, wherein each of the at least one deviation parameter describes a systematic deviation from reality for at least one input signal, one variable, or one condition for the catalyst model.

SUMMARY OF THE INVENTION

It is therefore an object of the invention to enable an evaluation of the distance-related ammonia and nitrogen oxide emissions in a gasoline engine and overcoming the disadvantages known from the prior art.

According to an example of the invention, this object is achieved by a method for evaluating a sensor signal of an exhaust NOx sensor, which is disposed downstream of a three-way catalytic converter in an exhaust system of a spark ignition internal combustion engine. The method of the invention can comprise the following steps: modeling an ammonia factor downstream of the three-way catalytic converter using an ammonia formation model; and modeling a NOx emission in the exhaust system downstream of the three-way catalytic converter using a NOx model; separating the modeled ammonia emissions and the modeled NOx emissions by a separation algorithm using the sensor signal of the exhaust NOx sensor, wherein the separation algorithm provides quantitative information about the tailpipe ammonia emissions and the tailpipe NOx emissions of the spark ignition internal combustion engine.

The ammonia formation model is a backward-looking model and calculates an ammonia factor that determines the deflection of the NOx sensor signal caused by ammonia. The NOx model determines the NOx concentration at the engine outlet (raw NOx emissions), the NOx emissions upstream of the three-way catalytic converter, and the tailpipe NOx emissions. Accordingly, the NOx model is a forward-looking model. In this regard, the modeled tailpipe NOx emissions, the ammonia factor, and the NOx sensor signal are transferred to the separation algorithm. As already described above, exhaust NOx sensors have a cross sensitivity to ammonia, so that an exhaust NOx sensor installed in the exhaust system detects both ammonia and nitrogen oxides. Due to the multiple modeling, redundant information, with which the separation algorithm can separate the NOx emissions and the ammonia emissions, is available in the method of the invention. The method of the invention therefore makes it possible to process the signal from the exhaust NOx sensor using the separation algorithm in such a way that the proportions of nitrogen oxides and ammonia can be deduced from the sensor signal.

The ammonia formation model can take into account a catalytic converter temperature and a combustion air ratio in the exhaust system downstream of the three-way catalytic converter. The modeling of the ammonia formation on the three-way catalytic converter can be improved thereby, so that the accuracy of the modeled ammonia emission can be improved.

The NOx model can take into account a catalytic converter temperature of the three-way catalytic converter, a combustion air ratio in the exhaust system downstream of the three-way catalytic converter, and an exhaust gas volume flow of the internal combustion engine. In particular, the modeling of the conversion of the raw NOx emissions of the internal combustion engine can be improved thereby by the three-way catalytic converter. The accuracy of the NOx model can thus be further improved with regard to NOx emissions downstream of the three-way catalytic converter.

The NOx model can additionally take into account an engine speed and/or an engine torque of the internal combustion engine. By taking into account the engine speed and/or the engine torque, in particular the engine speed and the engine torque, further improvement of the NOx model is possible. In particular, the formation of raw NOx emissions in the NOx model can be improved thereby, whereby the accuracy of the NOx model can be improved further with regard to the modeled tailpipe NOx emissions.

The NOx model can additionally take into account an ignition angle of the spark plugs of the internal combustion engine. Because the ignition angle has a direct influence on the raw emissions and the exhaust gas temperature, taking the ignition angle into account leads to a further improvement in the accuracy of the NOx model.

The ammonia emissions determined by the separation algorithm and the ammonia factor modeled by the ammonia formation model can be filtered by means of a Kalman filter. In this case, the ammonia emissions are calculated by the ammonia formation model and by the separation algorithm using two different models and weighted accordingly using the Kalman filter. A particularly precise calculation of the tailpipe ammonia emissions is possible thereby.

It is preferable if additional variances of the exhaust NOx sensor with regard to the measured ammonia emissions and variances of the ammonia formation model are filtered by the Kalman filter. The variances can be calculated using the input variables "catalytic converter temperature" and "combustion air ratio downstream of the three-way catalytic converter." This allows a separate ammonia factor to be determined which, multiplied by the sensor signal from the exhaust NOx sensor, enables a calculation of the ammonia and nitrogen oxide concentrations in the exhaust gas downstream of the three-way catalytic converter and thus the tailpipe emissions.

The NOx emissions determined by the separation algorithm and the NOx emissions modeled by the NOx model are filtered by means of a Kalman filter. After the separation of the NOx signal by the separation algorithm, the measurement noise and the component tolerance of the exhaust NOx sensor can be taken into account by integrating a Kalman filter.

Additional variances of the exhaust NOx sensor in relation to the measured NOx emissions and variances of the NOx model can be filtered by the Kalman filter. These variances can be gathered from the separation algorithm. Consequently, the integration of this approach is possible with little effort after the development of the forward-looking NOx model.

A further partial aspect of the invention relates to an engine control unit for an internal combustion engine with a memory unit and a computing unit as well as a computer program code stored in the memory unit, wherein the engine control unit is set up to execute a method described in the preceding sections when the computer program code is executed by the computing unit. Such an engine control unit enables the calculation and monitoring of the tailpipe emissions of an internal combustion engine with regard to nitrogen oxide and ammonia emissions. Therefore, an on-board monitoring of these pollutants can be realized, as it may be necessary to meet future emissions standards.

A further partial aspect of the invention relates to an internal combustion engine with at least one combustion chamber, wherein a fuel injector for injecting a fuel into the combustion chamber and a spark plug for igniting a fuel-air mixture are disposed at the combustion chamber. The internal combustion engine is connected by its outlet to an exhaust system, in which at least one three-way catalytic converter and an exhaust NOx sensor downstream of the three-way catalytic converter are disposed, as well as to an engine control unit according to the previous section. With such an internal combustion engine, the emissions can be monitored in a simple manner by the exhaust NOx sensor. In this case, monitoring of both NOx emissions and ammonia emissions is possible. Thus, these limited pollutants can be monitored as part of on-board monitoring.

The internal combustion engine can be turbocharged by means of an exhaust gas turbocharger, wherein a turbine of the exhaust gas turbocharger is disposed upstream of the three-way catalytic converter.

A first catalytic converter, in particular a three-way catalytic converter or a four-way catalytic converter, can be arranged in the exhaust system in the flow direction of an exhaust gas stream of the internal combustion engine through the exhaust system, and a second catalytic converter, in particular a three-way catalytic converter or a four-way catalytic converter, is disposed downstream of the first catalytic converter. Such a catalytic converter concept is helpful in meeting the strict emission requirements of new exhaust gas legislation. In this regard, there is the aforementioned problem that ammonia emissions can be produced by the three-way catalytic converter during a substoichiometric operation of the internal combustion engine. These ammonia emissions can be monitored by the method of the invention and minimized accordingly by adjusting the engine control.

A first lambda sensor, in particular a broadband sensor, can be disposed upstream of the first catalytic converter, a second lambda sensor, in particular a broadband sensor, is disposed downstream of the first catalytic converter and upstream of the second catalytic converter, and the exhaust NOx sensor is disposed upstream of the second catalytic converter. Therefore, a particularly precise control of the combustion air ratio in the combustion chambers of the internal combustion engine is possible, whereby the raw emissions of the internal combustion engine can be minimized and/or the effectiveness of the exhaust gas aftertreatment components can be maximized. Thus, particularly low tailpipe emissions can be achieved.

The exhaust NOx sensor can have a lambda sensor functionality. An exhaust NOx sensor is constructed of two cells separated by diffusion barriers and also known as cavities, as well as a Nernst cell and two pump cells. Furthermore, the exhaust NOx sensor has a heating element that heats the exhaust NOx sensor to an operating temperature of between 600° C. and 800° C. The exhaust gas enters the first cavity through the first diffusion barrier. Adjacent to this is a Nernst cell and a pump cell, with which the oxygen concentration in the first cavity is controlled to a few ppm. In this connection, oxygen can be pumped into or out of the first cavity. For this purpose, the exhaust NOx sensor includes a lambda sensor functionality to be able to determine the oxygen content in the exhaust gas stream and to regulate the oxygen concentration in the first cavity accordingly. As a result, incomplete combustion gases such as CO or HC are completely oxidized. However, the voltage applied is not sufficient to dissociate NO. After passing through the processes described, NO diffuses into the second cavity, which another oxygen pump abuts. The electrode of this oxygen pump is additionally made of rhodium. This precious metal has a catalytic effect on reducing processes. In addition, the voltage applied to the electrode is increased, which ensures complete dissociation of NO.

A temperature sensor can be disposed in the exhaust system downstream of an outlet of the internal combustion engine and upstream of the three-way catalytic converter. It is particularly preferable if a first temperature sensor is disposed downstream of a turbine of an exhaust gas turbocharger and upstream of a first catalytic converter and a second temperature sensor is disposed downstream of the first catalytic converter and upstream of a second catalytic converter.

The various embodiments of the invention mentioned in this application can be advantageously combined with one another.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
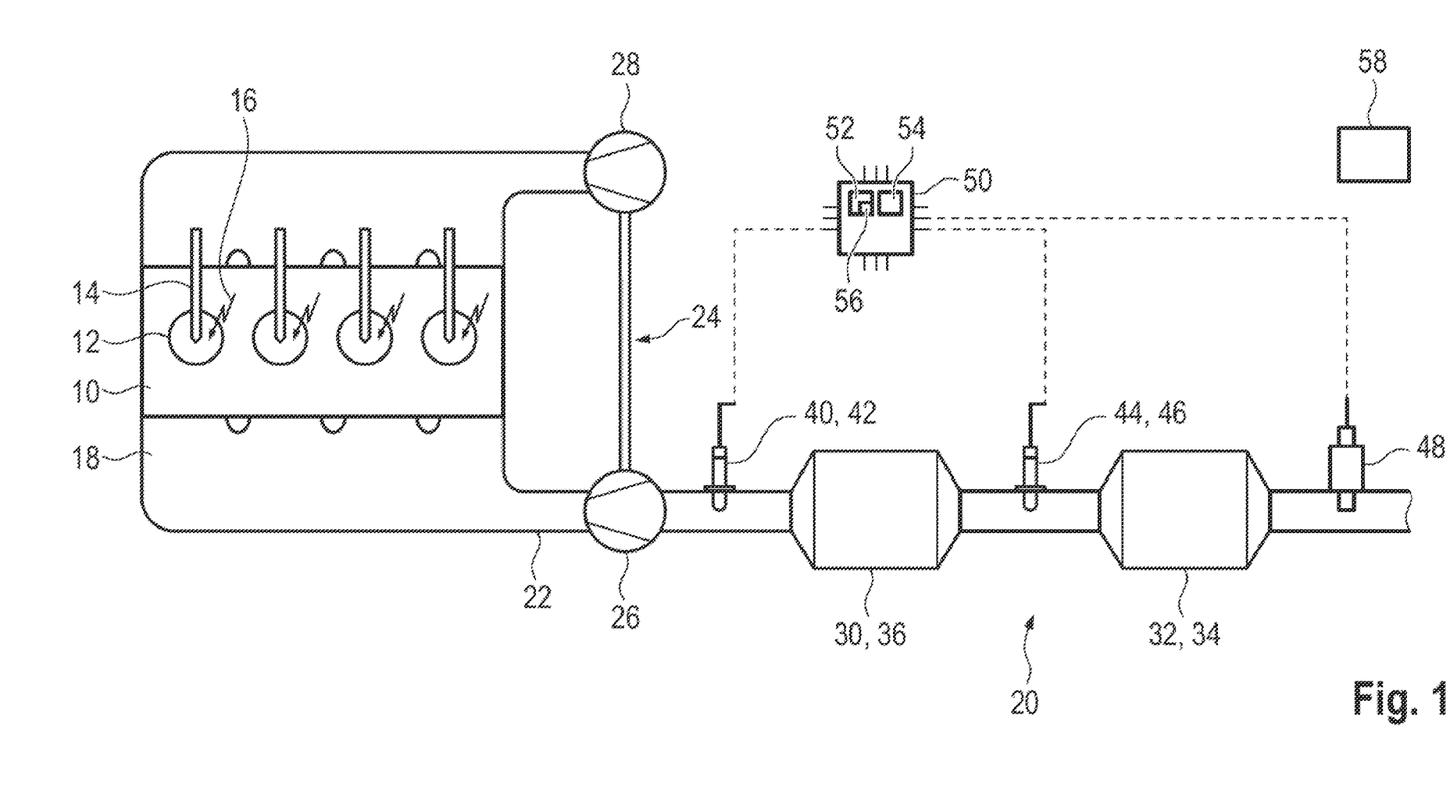
FIG. 1 shows an example for a spark ignition internal combustion engine with an exhaust system for carrying out a method of the invention for evaluating a signal from an exhaust NOx sensor.

FIG. 1 shows an example for a spark ignition internal combustion engine 10 with an exhaust system 20 for carrying out a method of the invention for evaluating a signal from an exhaust NOx sensor 48. The spark ignition internal combustion engine 10 is preferably designed as a direct-injection gasoline engine and has multiple combustion chambers 12. A fuel injector 14 is disposed at combustion chambers 12 for injecting a fuel into the respective combustion chamber 12. Further, a spark plug 16 is disposed at each combustion chamber 12 for igniting an ignitable fuel-air mixture in the respective combustion chamber 12. Combustion chamber 12 is bounded by a piston, which is displaceably disposed in a cylinder of internal combustion engine 10. The piston is connected to a crankshaft of internal combustion engine 10 via a connecting rod, wherein the connecting rod transmits an oscillating movement of the piston into a rotary movement of the crankshaft. Internal combustion engine 10 is connected with its inlet to an air supply system, and with its outlet 18 to an exhaust system 20. Disposed at combustion chambers 12 are inlet valves and outlet valves, with which a fluidic connection from the air supply system to combustion chambers 12 or from combustion chambers 12 to exhaust system 20 can be opened or closed.

Exhaust system 20 comprises an exhaust duct 22, in which a turbine 26 of an exhaust gas turbocharger 24 is disposed in the flow direction of an exhaust gas stream of internal combustion engine 10 through exhaust system 20, a first catalytic converter 30 is disposed downstream of the turbine 26, and a second catalytic converter 32 is disposed further downstream. In this example, first catalytic converter 30 is designed as a four-way catalytic converter 36 and second catalytic converter 32 as a three-way catalytic converter 34. A first lambda sensor 40, in particular a broadband lambda sensor 42, is disposed downstream of turbine 26 of exhaust gas turbocharger 24 and upstream of first catalytic converter 30. A second lambda sensor 44, in particular a jump sensor 46, is disposed downstream of first catalytic converter 30 and upstream of second catalytic converter 32. An exhaust NOx sensor 48 is disposed downstream of second catalytic converter 32. Turbine 26 of exhaust gas turbocharger 24 is connected via a shaft to a compressor 28 in the air supply system of internal combustion engine 10 and drives this compressor 28 when an exhaust gas stream is passed through turbine 26 of the exhaust gas turbocharger.

Fuel injectors 14, spark plugs 16, lambda sensors 40, 42, 44, 46, and exhaust NOx sensor 48 are connected to an engine control unit 50 of internal combustion engine 10 via signal lines. Engine control unit 50 comprises a memory unit 52 and a computing unit 54. Stored in memory unit 52 is a computer program code 56 which, when executed by computing unit 54, executes a method of the invention for evaluating an exhaust NOx sensor 48 in exhaust system 20 of a spark ignition internal combustion engine 10. Engine control unit 50 is connected to an on-board monitoring unit 58, which is used to monitor the emissions of internal combustion engine 10 during its operation.

Figure 2:
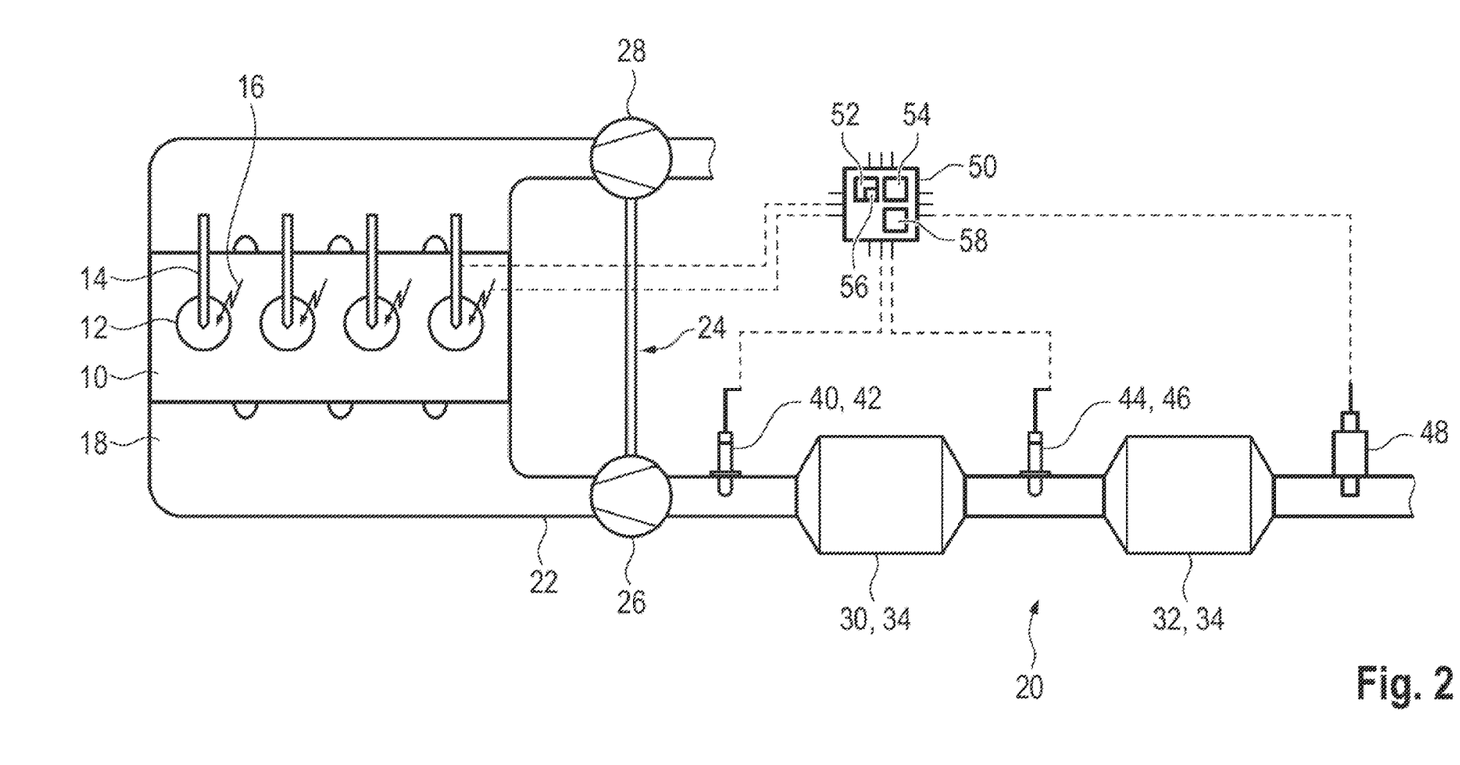
FIG. 2 shows an example for a spark ignition internal combustion engine with an exhaust system for carrying out a method of the invention for evaluating a signal from an exhaust NOx sensor.

A further example for a spark ignition internal combustion engine 10 with an exhaust system 20 for carrying out a method of the invention for evaluating a signal from an exhaust NOx sensor 48 is shown in FIG. 2. With essentially the same structure as explained in regard to FIG. 1, both the first catalytic converter 30 and second catalytic converter 32, arranged downstream of the first catalytic converter 30, are designed as three-way catalytic converters 34 in this example. Further, in this example, on-board monitoring unit 58 is integrated into control unit 50 of internal combustion engine 10. However, a separate on-board monitoring unit 58 can also be provided, as shown in FIG. 1.

Figure 3:
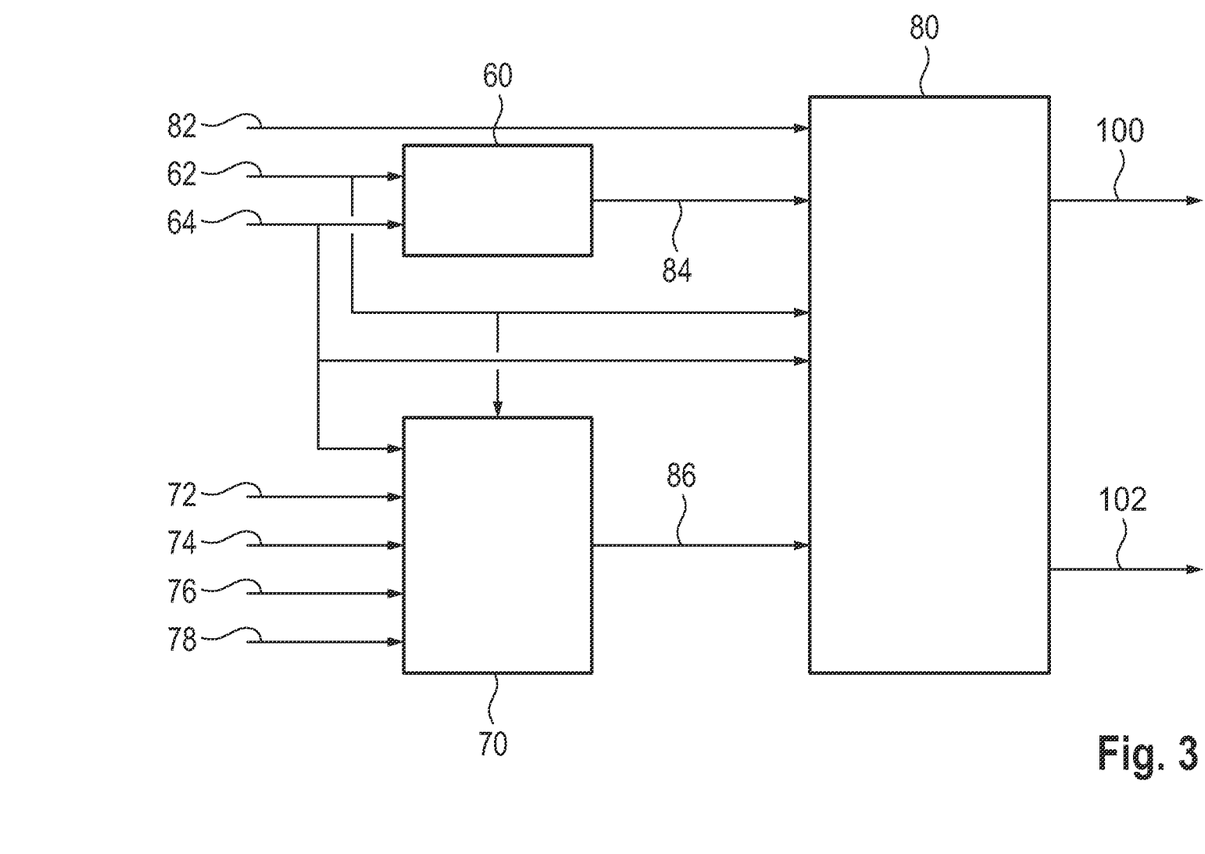
FIG. 3 shows a first concept diagram for determining the NOx and $NH_3$ emissions of the spark ignition internal combustion engine from the signal of the exhaust NOx sensor.

FIG. 3 shows a preferred flowchart for evaluating a sensor signal from an exhaust NOx sensor 48 in exhaust system 20 of a spark ignition internal combustion engine 10. In this case, an ammonia formation model 60 is used to determine an ammonia factor 84. Further, a NOx model 70 is used to model the NOx emissions 86 downstream of three-way catalytic converter 34. Further, a separation algorithm 80 is used to determine tailpipe ammonia emissions 100 and tailpipe NOx emissions 102 from ammonia factor 84, the modeled NOx emissions 86, NOx sensor signal 82, catalytic converter temperature 62 of three-way catalytic converter 34, and the combustion air ratio 64 downstream of three-way catalytic converter 34.

In this case, catalytic converter temperature 62 of three-way catalytic converter 34 and the combustion air ratio 64 downstream of three-way catalytic converter 34 are incorporated into ammonia formation model 60. NOx model 70 determines the raw emissions of internal combustion engine 10, as well as the NOx emissions 86 downstream of three-way catalytic converter from catalytic converter temperature 62 of three-way catalytic converter 34, the combustion air ratio 64 downstream of three-way catalytic converter 34, an exhaust gas volume flow 72 of internal combustion engine 10, an engine speed 74 of internal combustion engine 10, an engine torque 76 of internal combustion engine 10, and an ignition angle 78 of internal combustion engine 10.

Separation algorithm 80 calculates tailpipe ammonia emissions 100 and tailpipe NOx emissions 102 from ammonia factor 84, the modeled NOx emissions 86, NOx sensor signal 82, catalytic converter temperature 62 of three-way catalytic converter 34, and the combustion air ratio 64 downstream of three-way catalytic converter 34.

Figure 4:
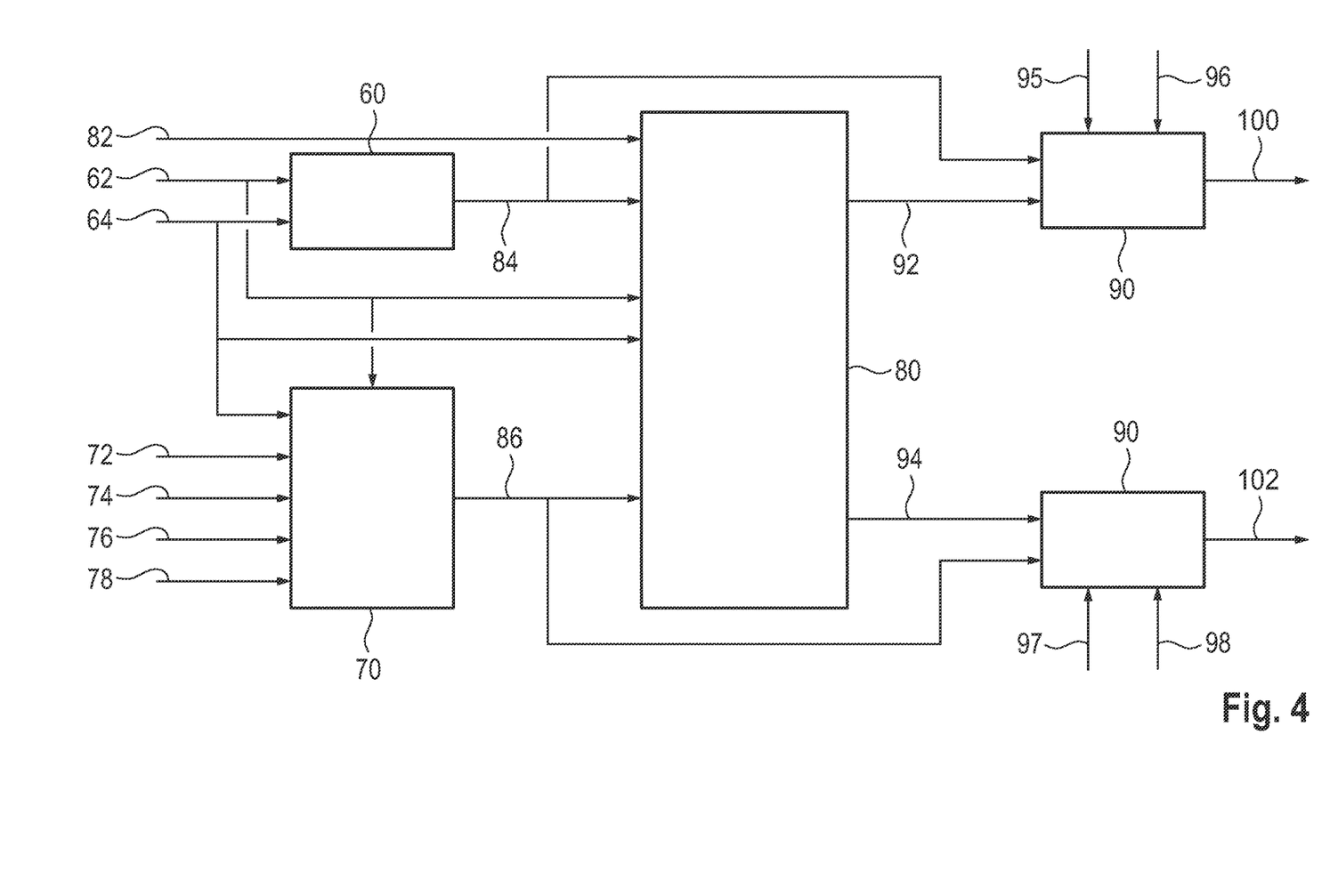
FIG. 4 shows a further concept diagram for determining the NOx and $NH_3$ emissions of the spark ignition internal combustion engine from the signal of the exhaust NOx sensor.

A flowchart diagram of a further method of the invention for evaluating a sensor signal from an exhaust NOx sensor 48 in exhaust system 20 of a spark ignition internal combustion engine 10 is shown in FIG. 4. In this case, an ammonia formation model 60 is used to determine an ammonia factor 84. Further, a NOx model 70 is used to model the NOx emissions 86 downstream of three-way catalytic converter 34. Further, a separation algorithm 80 is used to determine tailpipe ammonia emissions 92 and tailpipe NOx emissions 94 from ammonia factor 84, the modeled NOx emissions 86, NOx sensor signal 82, catalytic converter temperature 62 of three-way catalytic converter 34, and the combustion air ratio 64 downstream of three-way catalytic converter 34.

In this case, catalytic converter temperature 62 of three-way catalytic converter 34 and the combustion air ratio 64 downstream of three-way catalytic converter 34 are incorporated into ammonia formation model 60. The NOx model determines the raw emissions of internal combustion engine 10, as well as the NOx emissions 86 downstream of the three-way catalytic converter from catalytic converter temperature 62 of three-way catalytic converter 34, the combustion air ratio 64 downstream of three-way catalytic converter 34, an exhaust gas volume flow 72 of internal combustion engine 10, an engine speed 74 of internal combustion engine 10, an engine torque 76 of internal combustion engine 10, and an ignition angle 78 of internal combustion engine 10.

Separation algorithm 80 calculates tailpipe ammonia emissions 92 and tailpipe NOx emissions 94 from ammonia factor 84, the modeled NOx emissions 86, NOx sensor signal 82, catalytic converter temperature 62 of three-way catalytic converter 34, and the combustion air ratio 64 downstream of three-way catalytic converter 34. The calculated tailpipe ammonia emissions 92 and the calculated tailpipe NOx emissions 90 are each smoothed by a Kalman filter 90. In addition to the calculated tailpipe ammonia emissions 92, Kalman filter 90 also receives ammonia factor 84 from ammonia formation model 82 to determine tailpipe ammonia emissions 100. Further, Kalman filter 90 takes into account variances 95 of exhaust NOx sensor 48 and variances 96 of the ammonia formation model 60. For determining tailpipe NOx emissions 102, Kalman filter 90 receives the modeled tailpipe NOx emissions 86 in addition to the calculated tailpipe NOx emissions 94. In addition, Kalman filter 90 takes into account variances 97 of exhaust NOx sensor 48 and variances 98 of NOx model 70.

The concept includes a model in which the tailpipe $NH_3$ concentration 100 is calculated using two different model approaches. The $NH_3$ concentrations are weighted using a Kalman filter 90. The tailpipe $NO_x$ concentration 102 is the difference between the $NO_x$ sensor signal 82 and the tailpipe $NH_3$ concentration 100. The $NO_x$ sensor signal 82 is regarded as noise-free and the exhaust $NO_x$ sensor 48 as tolerance-free.

The model is structured in three parts and is formed of a $NH_3$ model 60, a $NO_x$ model 70, and separation algorithm

80. The input variables of the model are the $NO_x$ sensor signal 82, catalytic converter temperatures 62, and their lambda values 64, exhaust gas volume flow 72, engine speed 74, engine torque 76, and ignition angle 78. The $NH_3$ model 60 is a backward-looking model and calculates a $NH_3$ factor 84, which determines the deflection of the $NO_x$ sensor signal 82 caused by $NH_3$. The $NO_x$ model 70 determines the $NO_x$ concentration at the engine outlet, after first catalytic converter 30 and the tailpipe. Accordingly, the $NO_x$ model 70 is a forward-looking model. Both models 60, 70 are subject to model uncertainties due to assumptions and simplifications.

The modeled tailpipe $NO_x$ concentration 86, $NH_3$ factor 84, and $NO_x$ sensor signal 82 are transferred to separation algorithm 80. Consequently, there is redundant information with which separation algorithm 80 converts the tailpipe $NO_x$ concentration of the model into a second $NH_3$ factor according to the following formula:

$$NH_{3\_fac,2} = \frac{NO_{x,sens} - NO_{x,mod}}{NO_{x,sens}}$$

The confidence in the respective $NH_3$ factor 84 and its weighting is based on variances 95, 96, which are calculated using the input variables, catalytic converter temperature 62 and catalytic converter lambda 64. Thus, a separated $NH_3$ factor $NH_{3,fac\_sep}$ is determined, which, multiplied by the $NO_x$ sensor signal 82, determines the $NH_3$ and $NO_x$ concentrations 100, 102.

$$NH_{3,sep} = NH_{3,fac\_sep} \cdot NO_{x,sens}$$
$$NO_{x,Tailpipe} = (1 - NH_{3,fac\_sep}) \cdot NO_{x,sens}$$

The $NH_3$ value $NH_{3,sep}$ is then corrected with the varying cross sensitivity of the $NO_x$ sensor signal 82. The output variables of the model are the tailpipe $NO_x$ and $NH_3$ concentrations 92, 94. Model uncertainties can be minimized with this approach and the simultaneous occurrence of the emission components can be depicted.

A variant is the development of a forward-looking $NH_3$ model 60 that determines the $NH_3$ concentration 94, 102 independently of the $NO_x$ sensor signal 82. This model could be developed on the basis of Arrhenius equations. After the separation of the $NO_x$ sensor signal 82 by separation algorithm 80, the measurement noise and the component tolerance of exhaust $NO_x$ sensor 48, which together form the variance of sensor 97, 98, can be taken into account by integrating further Kalman filters 90. The variances 97, 98 of the models can be gathered from separation algorithm 80. As a result, the integration of this approach following the development of the forward-looking $NH_3$ model 70 can be carried out with little effort. Furthermore, an increase in model quality can be expected with this approach.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for evaluating a sensor signal of an exhaust NOx sensor that is disposed downstream of a three-way catalytic converter in an exhaust system of a spark ignition internal combustion engine, the method comprising:

modeling an ammonia factor downstream of the three-way catalytic converter using an ammonia formation model, the ammonia factor determining a deflection of the sensor signal of the exhaust NOx sensor caused by ammonia;

modeling a nitrogen oxide emission in the exhaust system downstream of the three-way catalytic converter using a nitrogen oxide model;

separating the modeled ammonia factor and the modeled nitrogen oxide emission by a separation algorithm using the sensor signal of the exhaust NOx sensor;

providing quantitative information, via the separation algorithm, about tailpipe ammonia emissions and tailpipe nitrogen oxide emissions of the spark ignition internal combustion engine; and adjusting control of the spark ignition internal combustion engine based on said tailpipe ammonia emissions, wherein the ammonia formation model takes into account:
   a catalytic converter temperature of the three-way catalytic converter;
   a combustion air ratio in the exhaust system downstream of the three-way catalytic converter; or
   an exhaust gas volume flow of the internal combustion engine.

2. The method according to claim 1, wherein the ammonia formation model takes into account a catalytic converter temperature of the three-way catalytic converter.

3. The method according to claim 1, wherein the ammonia formation model takes into account a combustion air ratio in the exhaust system downstream of the three-way catalytic converter.

4. The method according to claim 1, wherein the ammonia formation model takes into account an exhaust gas volume flow of the internal combustion engine.

5. An engine control unit for an internal combustion engine comprising:
   a memory;
   a processor; and
   computer program code stored in the memory unit,
   wherein the engine control unit is set up to execute the method according to claim 1 when the computer program code is executed by the processor.

6. An internal combustion engine comprising:
   at least one combustion chamber;
   a fuel injector for injecting a fuel into the combustion chamber and a spark plug for igniting a fuel-air mixture are arranged at the combustion chamber, wherein the internal combustion engine is connected by an outlet to an exhaust system, in which at least one three-way catalytic converter and an exhaust NOx sensor downstream of the three-way catalytic converter are arranged; and
   the engine control unit according to claim 5.

7. The internal combustion engine according to claim 6, wherein the internal combustion engine is designed as an internal combustion engine turbocharged via an exhaust gas turbocharger, and wherein a turbine of the exhaust gas turbocharger is disposed upstream of the three-way catalytic converter.

8. The internal combustion engine according to claim 6, wherein the exhaust NOx sensor has a lambda sensor functionality.

9. The internal combustion engine according to claim 6, wherein a first catalytic converter is disposed in the exhaust system in a flow direction of an exhaust gas stream through the exhaust system, and a second catalytic converter is disposed downstream of the first catalytic converter, and wherein at least one of the first or second catalytic converters is designed as the three-way catalytic converter.

10. The internal combustion engine according to claim 9, wherein a first lambda sensor is disposed upstream of the first catalytic converter, a second lambda sensor is disposed downstream of the first catalytic converter and upstream of the second catalytic converter, and the exhaust NOx sensor is disposed downstream of the second catalytic converter.

11. A method for evaluating a sensor signal of an exhaust NOx sensor that is disposed downstream of a three-way catalytic converter in an exhaust system of a spark ignition internal combustion engine, the method comprising:
   modeling an ammonia factor downstream of the three-way catalytic converter using an ammonia formation model;
   modeling a nitrogen oxide emission in the exhaust system downstream of the three-way catalytic converter using a nitrogen oxide model;
   separating the modeled ammonia factor and the modeled nitrogen oxide emission by a separation algorithm using the sensor signal of the exhaust NOx sensor; and
   providing quantitative information, via the separation algorithm, about tailpipe ammonia emissions and tailpipe nitrogen oxide emissions of the spark ignition internal combustion engine; and
   adjusting control of the spark ignition internal combustion engine based on said tailpipe ammonia emissions,
   wherein the ammonia formation model takes into account a catalytic converter temperature and a combustion air ratio in the exhaust system downstream of the three-way catalytic converter.

12. A method for evaluating a sensor signal of an exhaust NOx sensor that is disposed downstream of a three-way catalytic converter in an exhaust system of a spark ignition internal combustion engine, the method comprising:
   modeling an ammonia factor downstream of the three-way catalytic converter using an ammonia formation model;
   modeling a nitrogen oxide emission in the exhaust system downstream of the three-way catalytic converter using a nitrogen oxide model;
   separating the modeled ammonia factor and the modeled nitrogen oxide emission by a separation algorithm using the sensor signal of the exhaust NOx sensor;
   providing quantitative information, via the separation algorithm, about tailpipe ammonia emissions and tailpipe nitrogen oxide emissions of the spark ignition internal combustion engine; and
   adjusting control of the spark ignition internal combustion engine based on said tailpipe ammonia emissions,
   wherein the nitrogen oxide model takes into account a catalytic converter temperature of the three-way catalytic converter and a combustion air ratio in the exhaust system downstream of the three-way catalytic converter and takes into account an exhaust gas volume flow of the internal combustion engine.

13. The method according to claim 12, wherein the nitrogen oxide model additionally takes into account an engine speed and/or an engine torque of the internal combustion engine.

14. The method according to claim 12, wherein the nitrogen oxide model additionally takes into account an ignition angle of the spark plugs of the internal combustion engine.

15. A method for evaluating a sensor signal of an exhaust NOx sensor that is disposed downstream of a three-way catalytic converter in an exhaust system of a spark ignition internal combustion engine, the method comprising:
   modeling an ammonia factor downstream of the three-way catalytic converter using an ammonia formation model;
   modeling a nitrogen oxide emission in the exhaust system downstream of the three-way catalytic converter using a nitrogen oxide model;
   separating the modeled ammonia factor and the modeled nitrogen oxide emission by a separation algorithm using the sensor signal of the exhaust NOx sensor;
   providing quantitative information, via the separation algorithm, about tailpipe ammonia emissions and tailpipe nitrogen oxide emissions of the spark ignition internal combustion engine; and
   adjusting control of the spark ignition internal combustion engine based on said tailpipe ammonia emissions,
   wherein the ammonia emission determined by the separation algorithm and the ammonia factor modeled by the ammonia formation model are filtered via a Kalman filter.

16. The method according to claim 15, wherein variances of the exhaust NOx sensor with regard to ammonia and variances of the ammonia formation model are filtered additionally by the Kalman filter.

17. A method for evaluating a sensor signal of an exhaust NOx sensor that is disposed downstream of a three-way catalytic converter in an exhaust system of a spark ignition internal combustion engine, the method comprising:
   modeling an ammonia factor downstream of the three-way catalytic converter using an ammonia formation model;
   modeling a nitrogen oxide emission in the exhaust system downstream of the three-way catalytic converter using a nitrogen oxide model;
   separating the modeled ammonia factor and the modeled nitrogen oxide emission by a separation algorithm using the sensor signal of the exhaust NOx sensor;
   providing quantitative information, via the separation algorithm, about tailpipe ammonia emissions and tailpipe nitrogen oxide emissions of the spark ignition internal combustion engine; and
   adjusting control of the spark ignition internal combustion engine based on said tailpipe ammonia emissions,
   wherein the nitrogen oxide emissions determined by the separation algorithm and the nitrogen oxide emissions modeled by the nitrogen oxide model are filtered via a Kalman filter.

18. The method according to claim 17, wherein variances of the exhaust NOx sensor in relation to nitrogen oxides and variances of the nitrogen oxide model are additionally filtered by the Kalman filter.

19. A method for evaluating a sensor signal of an exhaust NOx sensor that is disposed downstream of a three-way catalytic converter in an exhaust system of a spark ignition internal combustion engine, the method comprising:
   modeling an ammonia factor downstream of the three-way catalytic converter using an ammonia formation model, the ammonia factor determining a deflection of the sensor signal of the exhaust NOx sensor caused by ammonia;
   modeling a nitrogen oxide emission in the exhaust system downstream of the three-way catalytic converter using a nitrogen oxide model;
   separating the modeled ammonia factor and the modeled nitrogen oxide emission by a separation algorithm using the sensor signal of the exhaust NOx sensor:

providing quantitative information, via the separation algorithm, about tailpipe ammonia emissions and tailpipe nitrogen oxide emissions of the spark ignition internal combustion engine; and adjusting control of the spark ignition internal combustion engine based on said tailpipe ammonia emissions, wherein the nitrogen oxide model takes into account an engine speed and/or an engine torque of the internal combustion engine.

20. A method for evaluating a sensor signal of an exhaust NOx sensor that is disposed downstream of a three-way catalytic converter in an exhaust system of a spark ignition internal combustion engine, the method comprising:

modeling an ammonia factor downstream of the three-way catalytic converter using an ammonia formation model, the ammonia factor determining a deflection of the sensor signal of the exhaust NOx sensor caused by ammonia;

modeling a nitrogen oxide emission in the exhaust system downstream of the three-way catalytic converter using a nitrogen oxide model;

separating the modeled ammonia factor and the modeled nitrogen oxide emission by a separation algorithm using the sensor signal of the exhaust NOx sensor;

providing quantitative information, via the separation algorithm, about tailpipe ammonia emissions and tailpipe nitrogen oxide emissions of the spark ignition internal combustion engine; and adjusting control of the spark ignition internal combustion engine based on said tailpipe ammonia emissions, wherein the nitrogen oxide model takes into account an ignition angle of the spark plugs of the internal combustion engine.

* * * * *